United States Patent [19]

Bonn

[11] E Patent Number: Re. 31,665

[45] Reissued Date of Patent: Sep. 11, 1984

[54] CRYOPUMP APPARATUS

[75] Inventor: John W. Bonn, Columbus, Ohio

[73] Assignee: CVI Incorporated, Columbus, Ohio

[21] Appl. No.: 502,367

[22] Filed: Jun. 8, 1983

Related U.S. Patent Documents

Reissue of:

[64] Patent No.: 4,275,566
Issued: Jun. 30, 1981
Appl. No.: 136,194
Filed: Apr. 1, 1980

[51] Int. Cl.[3] ..... B01D 8/00

[52] U.S. Cl. ..... 62/55.5; 55/269; 62/268; 417/901

[58] Field of Search ..... 62/55.5, 100, 268; 55/269; 417/901

[56] References Cited

U.S. PATENT DOCUMENTS

| | | | |
|---|---|---|---|
| 3,081,068 | 3/1963 | Milleron | 62/55.5 |
| 3,122,896 | 3/1964 | Hickey | 62/55.5 |
| 3,131,396 | 4/1964 | Santeler et al. | 62/55.5 |
| 3,137,551 | 6/1964 | Mark | 62/55.5 |
| 3,144,200 | 8/1964 | Taylor | 62/531 |
| 3,175,373 | 3/1965 | Hoelkeboer et al. | 62/55.5 |
| 3,177,672 | 4/1965 | Seelandt | 62/55.5 |
| 3,256,706 | 6/1966 | Hanson | 62/55.5 |
| 3,485,054 | 12/1969 | Hogan | 62/268 |
| 3,488,978 | 1/1970 | Della Porta et al. | 62/55.5 |
| 3,490,247 | 1/1970 | Wing | 62/55.5 |
| 3,579,997 | 5/1971 | Thibault et al. | 62/55.5 |
| 3,579,998 | 5/1971 | Rapinat | 62/55.5 |
| 3,668,881 | 6/1972 | Thibault et al. | 62/55.5 |
| 3,769,806 | 11/1973 | Boissin et al. | 62/55.5 |
| 4,072,025 | 2/1978 | Thibault | 62/55.5 |
| 4,121,430 | 10/1978 | Bachler et al. | 62/268 |
| 4,148,196 | 4/1979 | French et al. | 62/55.5 |
| 4,150,549 | 4/1979 | Longsworth | 62/268 |
| 4,198,829 | 4/1980 | Carle | 62/55.5 |
| 4,207,746 | 6/1980 | McFarlin | 62/55.5 |

OTHER PUBLICATIONS

"Measurements of Adsorption Isotherms and Pumping Speed of Helium on Molecular Sieve in the 10-11-10-7 Torr Range at 4.2 Kelvin," Journal of Vacuum Science & Technology, vol. 11, No. 1, pp. 331-336, Jan./Feb. 1974.

"Performance Assessment for Cryopumping," Vacuum, vol. 20, No. 11, pp. 477-480, Nov. 1970.

"Some Component Designs Permitting Ultra-High Vacuum with Large Oil Diffusion Pumps, " pp. 140-143, Vacuum Sym. Trans. of A.V.C. Inc. (1958).

"Introduction to Cryopump Design" Vacuum, vol. 26, No. 1, pp. 11-16, Jan. 1976.

"Vacuum Technology", International Science & Technology, Jan. 1963.

"Calculation of Cryopumping Speeds by the Monte Carlo Method," Vacuum, vol. 21, No. 5, pp. 167-173, May 1971.

*Primary Examiner*—Ronald C. Capossela
*Attorney, Agent, or Firm*—Seidel, Gonda & Goldhammer

[57] ABSTRACT

Cryopump apparatus includes means for supplying cryogenic fluid, means for supplying higher temperature refrigerant fluid, a panel having heat exchange surfaces on respective opposite sides thereof, with a conduit conducting cryogenic fluid therethrough, and a zigzag passageway formed by opposite sides of two radiation shields in spaced relationship with each other having the panel therebetween. The radiation shields are spaced from the panel, optically enclosing the panel therewithin. Corresponding edges of adjacent shields define open bottom channel-configured passageways for flow of gas therethrough to respective heat exchange surfaces of a panel interjacent the shields. The shields include conduits for flow of refrigerant fluid therethrough. Heat insulative positioning spacer means contact two adjacent panels and a shield therebetween, maintaining the panels and shield in spaced relationship.

18 Claims, 7 Drawing Figures

CRYOPUMP APPARATUS

Matter enclosed in heavy brackets [ ] appears in the original patent but forms no part of this reissue specification; matter printed in italics indicates the additions made by reissue.

BACKGROUND

This invention relates to cryopump apparatus used to evacuate large closed chambers to ultra-high vacuums.

DESCRIPTION OF THE PRIOR ART

Cryopump apparatus is known, widely used as cold traps between mechanical vacuum pumps and vacuum chambers, to prevent backstreaming of oil from the downstream mechanical vacuum pumps into the chamber to thereby maintain a high vacuum in the chamber. The traps may utilize actively cooled shields between a cryogenic temperature panel and juncture of the trap and the chamber. The shields, by blocking radiation heat transfer to the cryogenic panels, reduce the amount of cryogenic refrigeration capacity required to cool the cryogenic panels in the traps thereby reducing trap cost. The shields often are formed as chevrons, with a plurality of shields being disposed as parallel chevrons of substantially the same size and shape. Some shield configurations are shown in the cold traps disclosed in U.S. Pat. Nos. 3,081,068; 3,137,551; 3,175,373; 3,579,997 and 3,579,998; also refer to the paper "Some Component Designs Permitting Ultra-High Vacuum with Large Oil Diffusion Pumps" at pp 140–143 of the 1958 Vacuum Symposium Transactions of the American Vacuum Society, Inc. and the paper "Introduction to Cryopump Design" in Vacuum, Volume 26, No. 1, January, 1976 at pp 11–16.

The disclosed cold traps may all be considered to be cryopumps having cryogenic panels which pump from only a single side since only a single entrance to the cold traps, through which the pumped gas may travel to the cryogenic panel therewithin, is provided.

Other single entrance cryopumps are disclosed in U.S. Pat. Nos. 4,121,430 and 4,150,549. These pumps have only an entrance; they lack an exit and accumulate pumped condensed gas in the pump interior. The '549 patent discloses a chevron shield which optionally may be provided across the pump mouth which provides the opening for gas to enter the pump.

Use of chevron-shaped shields in cryopump apparatus is also disclosed in the paper "Optimization of Molecular Flow Conductance" presented at the Vacuum Technology Meeting held at Cleveland, Ohio in October of 1960, the article "Vacuum Technology" appearing in the January, 1963 issue of International Science & Technology, and in the paper "Calculation of Cryopumping Speeds by the Monte Carlo Method" appearing in Vacuum, Volume 21, No. 5, May, 1971 at pp 167–173; chevron-shaped shields are also mentioned in the article "Measurements of Adsorption Isotherms and Pumping Speed of Helium on Molecular Sieve in the 10-11-10-7 Torr Range at 4.2 Kevin" in the Journal of Vacuum Science and Technology, Volume 11, No. 1, January-February 1974, at pp 331–336.

Other cryopump applications including various shield configurations are shown in U.S. Pat. Nos. 3,144,200; 3,485,054; 3,488,978; 3,490,247; 3,668,881; 3,769,806; 4,072,025 and 4,148,196 and in the article "Performance Assessment for Cryopumping" appearing in Vacuum, Volume 20, No. 11, November, 1970 at pp 477–480. These patents and publications are believed less relevant than those recited in the previous paragraphs.

In large installations, such as space simulation chambers, pumping speeds required of cryopump apparatus are quite high and can only be achieved by placing the cryopump apparatus inside the chamber, usually adjacent to the chamber wall. In the case of large cryopumps, the cost of the ultra-low temperature cryogenic refrigeration equipment required for functioning of the pump is prohibitive, unless the pump surfaces are shielded, in much the same manner as the cold traps mentioned above, to reduce adsorption of radiant heat from the pump surroundings. To minimize such radiant heat transfer, the shields are cooled with liquid nitrogen and usually configured in such a way to protect the pumping panels from direct view by warm areas of the chamber. Unfortunately, shielding reduces pumping speed by requiring the gas molecules to be pumped to follow a circuitous path to reach the pumping panel from the open volume of the chamber. Shield-panel configurations which have been used in large chambers include the "chevron" array (a flat pumping panel having a flat shield parallel thereto, spaced from one surface thereof and having a series of parallel chevron-configured shields spaced from the remaining surface of the panel, axis of symmetry of the chevrons being parallel to the panel surface), the "Litton" array (a panel having flat shields parallel thereto and spaced on either side thereof, both shields being wider than the panel and one shield being twice the width of the remaining shield) and the "Santeler" array (a single flat shield having a plurality of parallel panels disposed at common angles to the shield and second shields extending from the single flat shield, one second shield per panel, parallel to the panels.) In the Santeler array the surface of each panel opposite the second shield is not totally shielded from direct impingement by external radiation. [See the drawing figure labeled "Prior Art."]

SUMMARY OF THE INVENTION

In cryopump apparatus including means for supplying cryogenic fluid, means for supplying refrigerant fluid, a panel including heat exchange surfaces on respective opposite sides thereof and having first conduit means for conducting the cryogenic fluid therethrough in heat transfer relationship with the heat exchange surfaces and means for delivering the cryogenic fluid to the panel conduit for flow through the conduit in heat exchange relationship with the panel heat exchange surfaces, a passageway of zigzag configuration is provided containing the panel and including a conduit for conducting the refrigerant fluid therethrough in heat transfer relationship with wall structure of the conduit, where mutually facing surfaces of the passageway and the panel are in spaced relationship, where the passageway has respective openings at respective opposite ends thereof for flow of gas therethrough to respective heat exchange surfaces of the panel enclosed therewithin, where the wall structure of the passageway is positioned between the panel and the passageway openings, for shielding the panel from view external of the cryopump apparatus.

DESCRIPTION OF THE PREFERRED EMBODIMENTS

Figure 1:
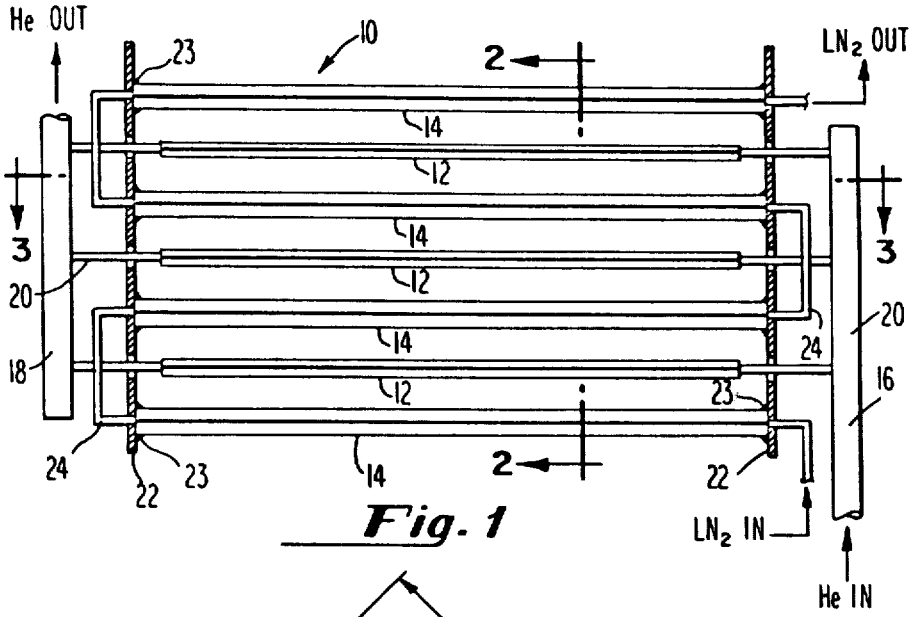
FIG. 1 is a vertically expanded side elevation, schematically depicting cryopump apparatus.
Figure 2:
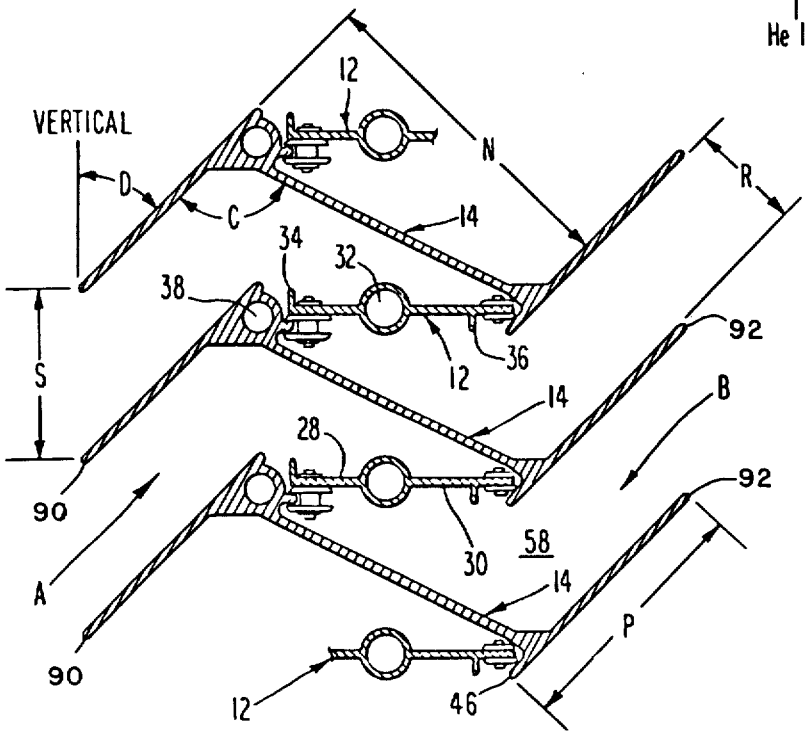
FIG. 2 is a sectional view taken at arrows 2—2 in FIG. 1, showing a preferred embodiment of the cryopump apparatus.
Figure 3:
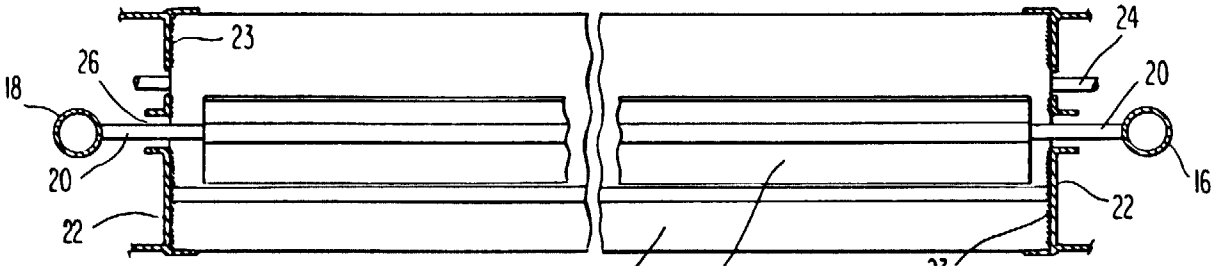
FIG. 3 is a partially broken sectional view, taken at arrows 3—3 in FIG. 1, showing a preferred embodiment of the cryopump apparatus.

Referring generally to FIGS. 1, 2 and 3, cryopump apparatus is designated generally 10 and includes a heat conductive panel, designated generally 12, in spaced interjacent relationship with a pair of heat conductive radiation shields, each designated generally 14. Preferably, a plurality of panels 12 and shields 14 are provided with panels 12 and shields 14 in individual spaced alternating interjacent relationship with a shield-panel-shield-panel-shield configuration as best shown in expanded schematic fashion in FIG. 1. FIG. 1 shows the shield-panel arrangement with the shields 14 and panels 12 in expanded, widely spaced schematic relationship to illustrate the alternation of panels and shields. It is to be understood that when the invention is constructed in the preferred embodiment, the shields 14 are placed sufficiently proximate one another that individual panels 12 between adjacent shields 14 are optically enclosed, by their adjacent shields, from direct view exterior of the cryopump apparatus; optical enclosure of the panels within adjacent shields, preventing direct lateral view of the panels, is best illustrated in FIG. 2.

Referring to FIG. 1, conduits 16 and 18 respectively supply and remove cryogenic fluid, preferably liquid helium, to and from the cryopump apparatus. Each panel 12 is connected by connector tubes 20 to conduits 16 and 18 so that parallel flow of cryogenic fluid through panels 12, from conduit 16 to conduit 18, results. Flow of the preferred liquid helium cryogenic fluid is denoted by arrows bearing the legends "He IN" and "He OUT" in FIG. 1.

Still referring to FIG. 1, shields 14 are secured at their two ends to heat conductive, metallic (preferably aluminum) manifold plates 22 with the connection preferably being by welds 23. Consequently, manifold plates 22 are thermally connected to shields 14 and assume the temperature of shields 14 which is substantially that of refrigerant fluid flowing through conduits integrally within shields 14. Conduits within adjacent shields 14 are serially connected by jumper tubes 24. The shields at the extreme top and bottom (viewing FIG. 1) of the cryopump apparatus have their conduits connected to a supply of refrigerant fluid, preferably liquid nitrogen, as indicated by the legend "$LN_2$ IN" and "$LN_2$ OUT" in FIG. 1. Consequently, flow of the preferably liquid nitrogen refrigerant fluid through shields 14 is a series flow pattern.

Clearance holes 26 for connection tubes 20 are provided in manifold plates 22 so connection tubes 20 do not contact manifold plates 22. Note also that panels 12 are slightly shorter in the longitudinal direction than the distance between manifold plates 22, assuring no contact between panels 12 and the manifold plates. This is best seen in FIG. 3. Note also from FIG. 3 that manifold plates are preferably formed from pairs of upstanding channels. Since manifold plates 22 are substantially the same temperature as shields 14, each heat conductive panel 12 "sees" only a surrounding environment, defined by the manifold plates 22 and the two shields adjacent to a panel 12, maintained substantially at the temperature of the refrigerant fluid.

Figure 5:
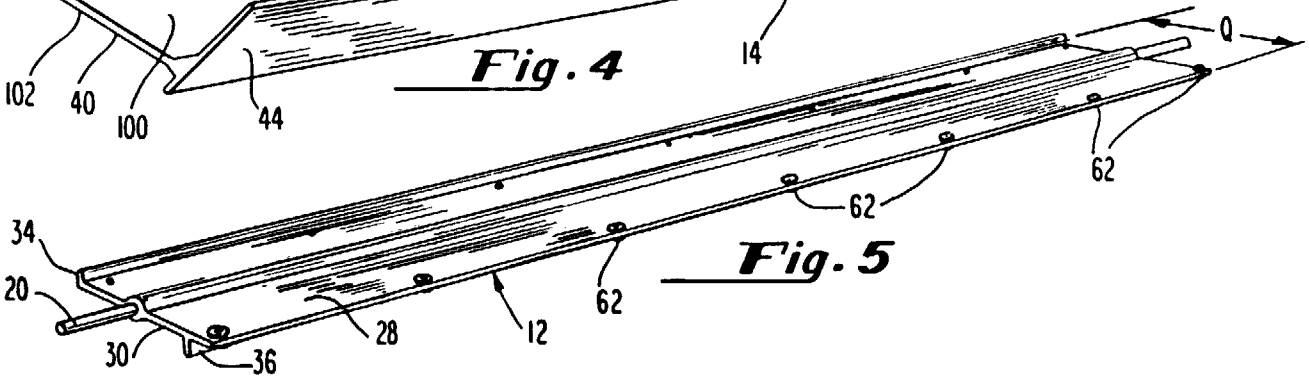
FIG. 5 is an isometric view of a heat conductive panel component of cryopump apparatus depicted in FIGS. 1, 2 and 3.

Referring to FIG. 5, each panel 12 has heat exchange surfaces 28 and 30 on opposite sides thereof and includes an integral conduit 32 for conducting cryogenic fluid through panel 12 in heat transfer relationship with heat exchange surfaces 28 and 30. Each panel is highly heat conductive, preferably aluminum, and formed as a single extruded member having conduit 32 integrally formed therein during the extrusion process. (In FIG. 5, connection tubes 20 are shown protruding from conduit 32 of the illustrated panel 12. Tubes 20 are preferably welded to panel 12.) Each panel 12 preferably has upstanding integral ribs 34 and 36 extending substantially the longitudinal length of the panel to resist panel deflection. Ribs 34 and 36 are also formed integrally with panel 12 as the panel is extruded. Note that ribs 34 and 36 are positioned on panel 12 remotely from conduit 32; this positioning illustrated in FIG. 2 provides maximum resistance to panel deflection since conduit 32, being of enlarged cross-section with respect to the remainder of panel 12, also serves to resist panel deflection.

Figure 4:
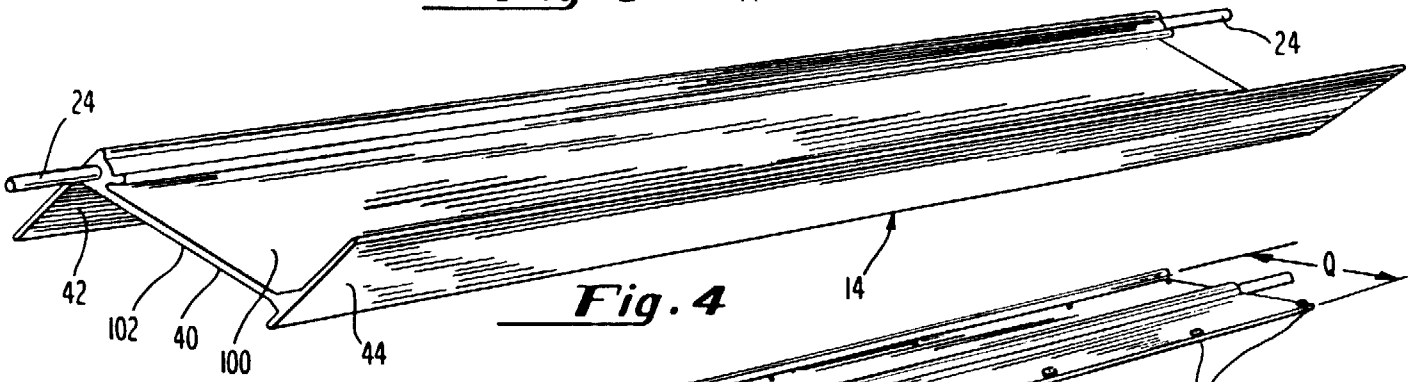
FIG. 4 is an isometric view of a radiation shield component of cryopump apparatus depicted in FIGS. 1, 2 and 3.
Figure 6:
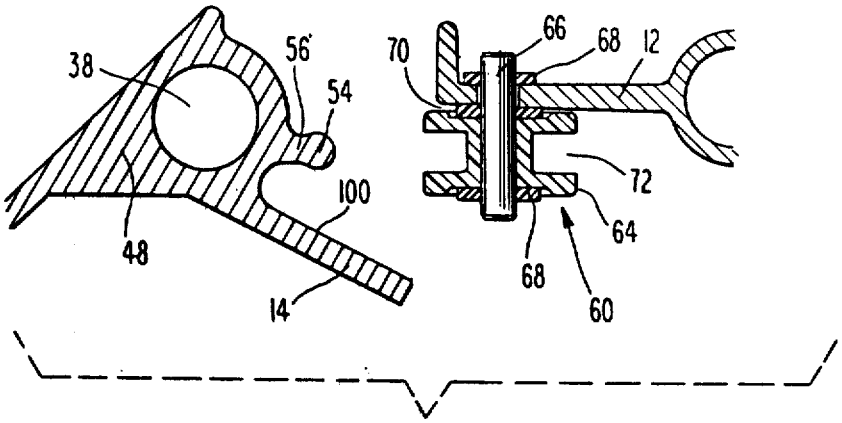
FIG. 6 is an expanded broken sectional view of portions of panel and radiation shield components of cryopump apparatus depicted in FIGS. 1, 2 and 3, illustrating one positioning spacer means which maintain the panels and shields in spaced relationship.
Figure 7:
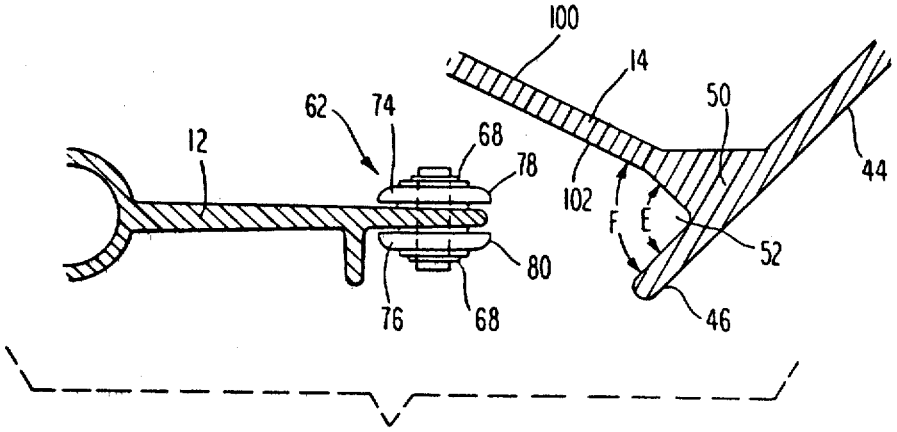
FIG. 7 is an expanded broken sectional view of portions of panel and radiation shield components of cryopump apparatus depicted in FIGS. 1, 2 and 3, illustrating a second spacer means which maintain the panels and shields in spaced relationship.

Referring to FIG. 4, each heat conductive radiation shield 14 has a "Z" shape and includes an integral conduit 38 extending longitudinally substantially the length thereof for flow of refrigerant fluid within shield 14. In FIG. 4, jumper tubes 24 are shown protruding from conduit 38 of the illustrated shield 14. Tubes 24 are preferably welded to shield 14. (Conduit 38 is best shown in FIG. 2.) Each shield preferably includes a central portion 40 and two edge portions respectively designated 42 and 44. The central and edge portions extend the longitudinal length of shield 12 with edge portions 42 and 44 extending in opposite directions to each other from respective longitudinally extending lateral boundaries of central portion 40 to thereby impart a z-shape to shield 14. Respective opposite surfaces of each shield are designated generally 100 and 102. Jumper tubes 24 extend from the ends of shield 14 to interconnect respective adjacent shields and to connect top and bottom shields at the vertical extremities of the cryopump apparatus to the supply of refrigerant fluid. Edge portions 42 and 44 of each shield 14 are parallel with one another. Shield 14 is extruded, with conduit 38 integrally formed as the shield is extruded, and includes an upstanding integral rib 46 extending substantially the longitudinal length of shield 14 to resist shield deflection. Note that conduit 38 is formed at juncture of central portion 40 and edge portion 42 while rib 46 is formed proximate the juncture of central portion 40 and remaining edge portion 44. Such spacing of rib 46 from conduit 38 provides great resistance to shield deflection since conduit 38, being of enlarged cross section with respect to the remainder of shield 14, also resists shield deflection. Each shield has a solid portion of enlarged cross-section at juncture of respective edge portions 42 and 44 with central portion 40; these portions of enlarged cross-section are denoted 48 and 50 respectively and are best seen in FIGS. 6 and 7. Rib 46 is formed as an oppositely directed extension of edge portion 44 and forms, with shield central portion 40, a longitudinally extending concavity of generally right angular configuration designated 52. This is best seen in FIG. 7. On a surface 100 of central portion 40, opposite the surface 102 which defines a portion of concavity 52, is formed a longitudinally extending lobe 54 connected by a neck 56 to shield 14 proximate the juncture of shield central portion 40 and edge portion 42. This is best illustrated in FIG. 6.

As seen in FIG. 2, surfaces 100 and 102 of each pair of adjacent z-shape shields 14 define a passageway 58 of zigzag configuration. Each panel 12 is contained within one of these zigzag configured passageways 58. Conduits 38 within shields 14 conduct refrigerant fluid therethrough to provide heat transfer relationship between the passageway wall structure, defined by surfaces 100 and 102 of shields 14, and the fluid. The respective panel surfaces 28 and 30 are spaced from the mutually facing surfaces 100 and 102 of the passageway 58 within which each panel 12 is contained. Each passageway 58 has openings at opposite ends thereof, defined by respective corresponding outward extremities 60 and 62 of respective edge portions 42 and 44 of adjacent shields 14, for flow of gas therethrough to respective heat exchange surfaces 28 and 30 of panel 12 contained within passageway 58. Corresponding respective edge portions 42 and 44 of adjacent shields overlap without contacting one another, to optically enclose individual panels 12 within each pair of adjacent shields 14. The edge portions 42 and 44 forming the wall structure of the passageway 58 are effectively positioned between the enclosed panel and the opening defined by respective corresponding extremities [60] *90* and [62] *92* of adjacent shields 14. The corresponding edge portions 42 and 44 of adjacent shields may be considered to define respective longitudinally extending open bottom channel passageways for flow of gas to the respective heat exchange surfaces of the enclosed panel.

The panels 12 and shields 14 are preferably all parallel one to another. Central portions 40 of the shields optically block adjacent panels 12 one from another and have transverse width, when projected onto said panels, in excess of panel width. The shield central portions are preferably skew to the panels as illustrated in FIG. 2.

Longitudinally spaced along panel 12 are a plurality of first and second positioning spacer means respectively generally denoted 60 and 62. These first and second positioning spacer means cooperate respectively with lobe 54 and concavity 52 to maintain the spaced relationship between adjacent panels 12 and shields 14 while allowing thermally induced relative longitudinal movement between adjacent panels 12 and shields 14.

As best shown in FIG. 6, first positioning spacer means 60 includes a heat insulative block 64 secured to panel 12 by a round shaft 66 in engagement with pushon speed nuts 68. Shaft 66 passes through a clearance hole in panel 12 and through a central aperture in block 64. A washer 70 is provided between block 64 and panel 12. Block 64 and shaft 66 are preferably formed of a phenolic resin-based material, having high heat insulative characteristics, such as the polycarbonate resin sold by General Electric Company under the trademark LEXAN. Within block 64 is a slot 72 preferably extending circumferentially around block 64. Slot 72 is oriented with at least a portion thereof in the longitudinal direction to slideably receive, in articulating engagement, lobe 54 of an adjacent panel 14. This articulating engagement is best illustrated in FIG. 2. (In FIG. 6 the first spacer means has been separated from the lobe to impart greater clarity to the drawing.)

In the opposite edge of panel 12 from first spacer means 60 is second spacer means 62 which includes first and second disc-like spacer portions 74 and 76 each having an outwardly facing convex surface, said convex surfaces being respectively designated 78 and 80 in FIG. 7. Spacer portions 74 and 76 are preferably the same heat insulative material as block 64 and are secured on opposite surfaces of panel 12 by a shaft 82 extending through portions 74 and 76 and through a clearance hole in panel 12, with speed nuts 68 engaging shaft 82 exterior of spacer portions 74 and 76. Shaft 82 is also made of a heat insulative material, preferably the same material as block 64. Unnumbered washers separate speed nuts 68 from spacer portions 74 and 76. Spacer portions 74 and 76 are slideably received by concavity 52 of an adjacent shield, as best seen in FIG. 2, with concave surfaces 78 and 80 contacting respective planar surfaces of concavity 52. In FIG. 7 the second spacer means has been separated from the concavity in order to impart greater clarity to the drawing.

Since adjacent shields are retained in position by secure connection to manifold plates 22, there is no relative movement between adjacent shields. However, the sliding engagement of lobe 54 within slot 72, and the sliding receipt of disc-like spacer portions 74 and 76 by concavity 52, all as best seen in FIG. 2, permit thermally induced relative longitudinal movement between a panel 12 and its enclosing shields 14. This is required since panels 12, preferably being cooled by liquid helium, are cooled to a substantially lower temperature than are shields 14 which are preferably cooled by liquid nitrogen. Consequently, when the cryopump apparatus is started and the preferred liquid helium and liquid nitrogen are introduced to the panels and shields respectively, as the cryopump apparatus cools to its operating temperature the panels will contract substantially more than will the shields with relative motion between the panels 12 and shields 14 resulting.

Note that the curved exterior surface of lobe 54 contacts straight surfaces defining the interior of groove 72 and similarly that curved convex surfaces 78 and 80 contact straight surfaces defining concavity 52. This curved surface-straight surface pairing results in only line contact between the surfaces of interest, assuring minimal heat transfer between adjacent panels and shields.

During operation of the cryopump apparatus, liquid nitrogen and liquid helium are respectively pumped in the directions indicated by the arrows and legends in FIG. 1. Upon cooling of the panels and shields to the respective cryogenic and refrigerant fluid temperatures, gas molecules, of gases having freezing points above the temperature of liquid helium, which encounter panels 12 will adhere thereto. Gas molecules entering between adjacent shields, in the directions respectively denoted by arrows A and B in FIG. 2, will, upon encountering the respective surfaces 28 and 30 of panel 12, interjacent the two shields, adhere to the respective surface 28 or 30 of panel 12, providing the pumping effect. The shields and manifold plates optically enclosing the panel within an environment maintained substantially at the temperature of liquid nitrogen reduce radiant heat transfer to the panel from warm objects exterior of the cryopump apparatus, thereby minimizing the amount of refrigeration equipment required to maintain liquid helium flowing through the panels.

The cryopump shields and panels are preferably fabricated of aluminum. Aluminum is especially suitable because of its good thermal conductivity, relative ductility at low temperatures and ease of forming by extrusion into the shapes required of the panels and shields.

The cryopump apparatus may be mounted in a vacuum chamber by securing manifold plates 22 within the chamber interior in any suitable, relatively heat insulative, manner.

No bellows are utilized by the cryopump apparatus. The floating construction of panels 12 with respect to radiation shields 14 and manifold plates 22 allows for thermal expansion and contraction and provides greater reliability than is attainable when using bellows for this function. Orienting the cryopump apparatus as illustrated in FIG. 1, with manifold plates 22 generally vertically upstanding and with the panels and shields in a generally vertically stacked configuration, facilitates thermally induced relative movement between the panels and shields while maintaining relative rigid construction.

The apparatus may be constructed with panels 12 and shields 14 ranging in length up to about twenty-nine feet, between manifold plates 22 as seen in FIG. 1. The panels 12 and shields 14 have been extruded by the Magnode Corporation of Trenton, Ohio. The upstanding ribs 34 and 46 in combination with the conduits formed integrally within the panels and shields prevent excessive deflection of the panels and shields. Preferred geometry for the shields is to have angle C, in FIG. 2, about 109°, with angle D about 45° with the vertical as also illustrated in FIG. 2. Angle E, shown in FIG. 7, is preferably about 90° while angle F, also shown in FIG. 7, is preferably about 71°. The shields may be fabricated having a horizontal width, as viewed in FIG. 2, of about fourteen inches, and mounted on manifold plates 22 so there is about four inches between corresponding parts of adjacent shields. A panel enclosed by such a shield may preferably be about 5⅛ inches wide, as denoted by Q in FIG. [2] 5. The panel is about one quarter inch thick at the panel central portion immediately adjacent conduit 32 with the shield likewise being about one quarter inch thick in the areas of central and edge portions 40, 42 and 44 removed from juncture thereof.

Spacers 60 and 62 may be up to seven feet apart when the panels and shields are made in the twenty-nine foot length. It is important that the spacers 60 and 62 not be spaced so far apart that deflection of the panels results in panel-shield contact since such contact would effectively "short circuit" the shield, causing the shield to drop to the temperature of the panel during pump operation with a consequent dramatic increase in required cryogenic refrigeration.

The shield central portions may have length of about seven and one half inches in the direction indicated by dimension N in FIG. 2 and with the edge portions having length about five and one half inches, as indicated by P in FIG. 2. This results in a perpendicular spacing between adjacent shields of about two and one half inches as indicated by R in FIG. 2.

The angles between the shield edge and central portions are not critical so long as the shields retain their z-shape and thereby optically blind the enclosed panels from exterior view. However, as shields are spaced further apart, to maintain optical blinding of the enclosed panel from external view, the angle C, between the shield edge portion and central portion in FIG. 2, must decrease. As angle C decreases, pumping speed of the array will also decrease. However, as panel width, denoted Q in FIG. 5, increases, pumping speed increases. One of the advantages of the cryopump configuration disclosed is that the ratio of panel width Q to distance between adjacent shields S (FIG. 2) is high, resulting in high pumping speed.

Region 58 in FIG. 2 can be considered as a cavity in which the panel 12 forms a portion of the cavity wall and the remainder of the cavity wall is formed by a central portion of a shield 14. The entrance to the cavity may be considered to be along a line (not illustrated in FIG. 2) connecting the corresponding junctures of the central and edge portions of adjacent shields. The edge portion of the shield whose central portion forms the remainder of the cavity wall extends from the cavity opening to blind the panel within the cavity from direct incidence of radiation originating outside the cavity. The edge portion of the shield is positioned so that any straight line drawn from the panel within the cavity through the cavity opening intersects the shield edge portion. This necessarily defines optical blinding of the panel by the shield edge portion. An advantage of disclosed cryopump is that these cavities are formed in pairs, in a nested arrangement, with each panel contributing a pumping surface forming part of the interior of two pumping cavities. Substantially the entire surface of each panel is exposed for pumping.

The relationship between the size of the cavity opening, defined by dimension S in FIG. 2, and the cavity depth, defined by panel width Q in FIG. 5, establishes the theoretical maximum pumping speed of the invention.

When the cryopump of the invention is compared to pumps utilizing the "chevron" array, with chevrons forming the same angle with their associated pumping panel as angle "D" in FIG. 2, the pumping speed of the invention is superior. In pumps utilizing the chevron-configured array, the optimum angle between the chevron and the associated pumping panel is known to be 60°. This yields a pumping speed of 0.28 (see FIG. 6 of paper presented at the Vacuum Technology Meeting at Cleveland, Ohio, in October, 1960 as noted above in the Description of the Prior Art), which is the maximum pumping speed for a cryopump utilizing a chevron-configured shield array. Surprisingly, pumping speed of the invention always exceeds 0.28, with the amount of the excess being controlled by the relationship between the size of the cavity opening, defined by dimension S in FIG. 2, and the cavity depth, defined by panel width Q in FIG. 5. As Q/S increases, pumping speed increases. The following table gives pumping speed of the invention for various values of Q/S and angle D in FIG. 2.

| D | Q/S | Pumping Speed |
|---|---|---|
| 45° | 1 | 0.287 |
| 45° | 2 | 0.335 |
| 60° | 2 | 0.379 |

These pumping speeds represent the fraction of molecules incident at the openings to the pump of the invention defined by corresponding outer extremities [60] *90* and [62] *92* of edge portions 42 and 44 of adjacent shields 14. See the paper "Calculation of Cryopumping Speeds by the Monte Carlo Method" for an exemplary method of determining pumping speed.

I claim the following:

1. In cryopump apparatus including:

(a) means for supplying cryogenic fluid;

(b) means for supplying refrigerant fluid;

(c) a panel including:

(i) heat exchange surfaces on respective opposite sides thereof; and (ii) first conduit means for conducting said cryogenic fluid therethrough in heat transfer relationship with said heat exchange surfaces;

(d) means delivering said cryogenic fluid to said panel conduit *means* for flow through said conduit *means* in heat exchange relationship with said panel heat exchange surfaces;

the improvement comprising:

(e) a passageway, of zigzag configuration, containing said panel, and including a conduit for conducting said refrigerant fluid therethrough in heat transfer relationship with wall structure of said conduit;

wherein mutually facing surfaces of said passageway and said panel are in spaced relationship;

wherein said passageway has openings at opposite ends thereof for flow of gas therethrough to respective heat exchange surfaces of said panel; wherein said wall structure is positioned between said panel and said openings for shielding said panel.

2. In cryopump apparatus including:

(a) means for supplying cryogenic fluid;

(b) means for supplying refrigerant fluid;

(c) a plurality of heat conductive panels, each panel including:

(i) heat exchange surfaces on respective opposite sides thereof; and (ii) first conduit means for flow of said cryogenic fluid therethrough;

wherein said first [conduits are] *conduit means is* connected to said cryogenic fluid supply means for flow of cryogenic fluid from said supply through said first conduit means;

the improvement comprising:

(d) a plurality of heat conductive radiation shields in spaced alternating interjacent relationship with said panels, each shield including:

(i) second conduit means for flow of said refrigerant fluid therethrough;

wherein adjacent shields overlap one another to optically enclose said panels within said shields, with corresponding respective [edges] *edge portions* of said shields defining respective channel passageways for flow of gas therethrough to respective heat exchange surfaces of said panels interjacent said shields; wherein said second [conduits are] *conduit means is* connected to said refrigerant fluid supply means for flow of refrigerant fluid from said supply through said shields; and (e) heat insulative positioning means contacting adjacent panels and shields for maintaining adjacent panels and shields in spaced relationship.

3. Apparatus of claim 2 wherein said shields have longitudinally extending concavities formed in second surfaces thereof and wherein said positioning means comprises;

(a) first spacer means, including a lobe longitudinally slideably received by a slot, in articulating engagement with at least one member of an adjacent shield-panel combination; and (b) second spacer means of convex exterior configuration secured to said panel of said shield-panel combination;

wherein said convex exterior of said second spacer means is longitudinally slideably received by said concavity of a shield [separated from said shield of said shield-panel combination by said panel].

4. Apparatus of claim 3 wherein said concavities are angularly configured and said convex exterior of said second spacer means is rounded.

5. Apparatus of claim 2 wherein each shield comprises a central portion and two edge portions extending at common angles from respective sides of said central portion, said central and edge portions extending longitudinally the length of each shield *said* central portions of said shields being skew to said panels, wherein said shield central portions are in alternating interjacent relationship with said panels and optically block said panels one from another, wherein said shield [edges] *edge portions* optically enclose said panels from lateral view.

6. Apparatus of claim 5 wherein said panels [and shields] are parallel one with another *and said shields are parallel one with another.*

7. Apparatus of claim 6 wherein shield edge portions are parallel with one another and extend away from said shield central portion in opposite directions.

8. Apparatus of claim 7 wherein central portions of said shields have width, projected onto said panels, greater than panel width.

9. Apparatus of claim 8 wherein each panel includes at least one upstanding integral rib extending substantially the longitudinal length thereof, transversely displaced from said first conduit, to resist panel deflection in directions other than longitudinal.

10. Cryopump apparatus comprising:

(a) means for supplying cryogenic fluid;

(b) means for supplying refrigerant fluid;

(c) a plurality of extruded longitudinally elongated transversely extending heat conductive parallel panels, each panel including an upstanding integral rib extending substantially the longitudinal length thereof to resist panel deflection in directions other than longitudinal, each panel including a longitudinally extending conduit for flow of cryogenic fluid therewithin, said conduit displaced transversely from said rib and connected to said cryogenic fluid supply means for flow of cryogenic fluid therethrough, (d) a plurality of extruded longitudinally elongated heat conductive parallel shields, each including a central portion and two edge portions, said central portion having width projected in the transverse direction greater than panel width, said central and edge portions extending the longitudinal length of said shields, said edge portions extending in opposite directions from said central portion to impart a z-shape to said shields, each shield in the areas of edge portion-central portion juncture being thicker than said edge and central portions alone, each shield including a longitudinally extending conduit connected to said refrigerant fluid supply means for flow of refrigerant fluid therethrough, said conduit being proximate juncture of said central portion and one of said edge portions, each shield including a longitudinally extending lobe connected by a neck to said shield proximate juncture of said central portion and one of said edge portions, and each shield including a longitudinally extending concavity proximate juncture of said central portion and a remaining edge portion, said central portion joining said remaining edge portion at an intermediate position thereon so that said remaining edge portion extends in two opposite directions from said central portion, said concavity formed in a shield surface opposite that from which said lobe extends;

wherein said shields are in spaced alternating interjacent relationship with said panels, shield central portions optically blocking adjacent panels one from another, wherein respective corresponding edge portions of adjacent shields define respective channels for gas flow to respective surfaces of panels located between adjacent shield central portions, wherein said shield edge portions optically block panels enclosed therewithin from lateral view exterior of said shields, through said channels;

(e) first spacer means including heat insulative blocks secured to said panels proximate first lateral edges thereof, each block having a slot therein with at least a portion thereof disposed in the longitudinal direction;

wherein a lobe of a first shield adjacent to a panel is slideably received by said slot of first spacer means associated with said panel for relative longitudinal movement of said first shield with respect to said panel;

(f) second heat insulative spacer means, provided in paired relationship with said first spacer means, secured to said panels proximate a second lateral edge thereof, including first and second spacer portions each having outwardly facing convex surfaces;

wherein said first and second spacer portions of one of said second heat insulative spacer means are slideably received by the concavity of a second shield, said second shield being adjacent said first shield but separated therefrom by said panel to which said first and second spacer means are secured, for longitudinal movement of said second shield with respect to said panel.

11. In cryopump apparatus including:

(a) means for supplying cryogenic fluid (b) means for supplying refrigerant fluid (c) a panel, having an exterior pumping surface, in heat transfer relationship with said cryogenic fluid (d) a shield, blinding direct incidence of externally generated radiation on said pumping surface, in heat transfer relationship with said refrigerant fluid, the improvement comprising:

(e) a cavity including said pumping surface forming a portion of the cavity wall, the remainder of said cavity wall being formed by a first portion of said shield and (f) a second portion of said shield extending outwardly from the mouth of said cavity, positioned so that any straight line, if drawn between said pumping surface and [the lip of] the cavity mouth, would, if extended, intersect said second portion of said shield.

12. In cryopump apparatus including:

(a) means for supplying cryogenic fluid (b) means for supplying refrigerant fluid (c) a panel, having an exterior pumping surface, in heat transfer relationship with said cryogenic fluid (d) a shield, blinding direct incidence of externally generated radiation on said pumping surface, in heat transfer relationship with said refrigerant fluid, the improvement comprising:

(e) a cavity including (i) said pumping surface forming a portion of the cavity wall; and (ii) a shielding surface in heat transfer relationship with said refrigerant fluid, forming the remainder of the cavity wall; and (f) said shield, being exterior of the cavity mouth, and positioned so that any straight line, if drawn between said pumping surface and the cavity mouth would, if extended, intersect said shield.

*13. Cryopump apparatus including:*

*(a) a plurality of parallel heat conductive panels, each panel including:*

*(i) heat exchange surfaces on respective opposite sides thereof; and*

*(ii) first conduit means for flow of a cryogenic fluid therethrough;*

*wherein said first conduit means is adapted to be connected to a cryogenic fluid supply means for flow of cryogenic fluid through said first conduit means; and*

*(b) a plurality of heat conductive radiation shields in spaced alternating interjacent relationship with said panels, each shield including:*

*(i) second conduit means for flow of a refrigerant fluid therethrough;*

*wherein adjacent shields overlap one another to optically enclose said panels within said shields, with corresponding respective edge portions of said shields defining respective channel passageways for flow of gas threthrough to respective heat exchange surfaces of said panels interjacent said shields; wherein said second conduit means is adapted to be connected to a refrigerant fluid supply means for flow of refrigerant fluid through said shields.*

*14. Apparatus of claim 13 including heat insulative positioning means contacting adjacent panels and shields for maintaining adjacent panels and shields in spaced relationship.*

*15. Apparatus of claim 13 wherein said shield edge portions are substantially planar and form an angle with the vertical within a range of approximately 45° to approximately 60°.*

*16. Apparatus of claim 13 wherein each shield comprises a central portion and two edge portions, said central portions having a width greater than the width of said panels.*

*17. Apparatus of claim 13 wherein each panel includes an integral rib extending substantially the longitudinal length thereof to resist panel deflection in directions other than longitudinal.*

*18. Apparatus of claim 17 wherein the rib comprises a longitudinal edge portion of said panel, said longitudinal edge portion projecting out of the plane of said panel.*

* * * * *